United States Patent
Kirigin

(10) Patent No.: US 11,385,757 B2
(45) Date of Patent: *Jul. 12, 2022

(54) SYSTEMS AND METHODS FOR FACILITATING COMMUNICATION BETWEEN USERS OF A CONTENT MANAGEMENT SERVICE

(71) Applicant: Dropbox, Inc., San Francisco, CA (US)

(72) Inventor: Ivan Kirigin, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,758

(22) Filed: Dec. 27, 2018

(65) Prior Publication Data

US 2019/0129544 A1   May 2, 2019

Related U.S. Application Data

(63) Continuation of application No. 13/723,155, filed on Dec. 20, 2012, now Pat. No. 10,198,140.

(51) Int. Cl.
  *G06F 3/048* (2013.01)
  *H04L 12/18* (2006.01)
  *G06F 16/176* (2019.01)

(52) U.S. Cl.
  CPC ............ *G06F 3/048* (2013.01); *G06F 16/176* (2019.01); *H04L 12/1813* (2013.01); *H04L 12/1831* (2013.01)

(58) Field of Classification Search
  CPC ... G06F 3/048; G06F 16/176; H04L 12/1813; H04L 12/1831

USPC ........................................................ 715/758
See application file for complete search history.

(56) References Cited

U.S. PATENT DOCUMENTS

| | | | |
|---|---|---|---|
| 8,788,584 B2 | 7/2014 | Huxley | |
| 2002/0160751 A1* | 10/2002 | Sun | H04M 1/6505 455/412.1 |
| 2006/0155785 A1* | 7/2006 | Berry | G06Q 10/10 |
| 2008/0028323 A1* | 1/2008 | Rosen | G06Q 10/10 715/752 |
| 2008/0159286 A1 | 7/2008 | Moore et al. | |
| 2009/0094537 A1 | 4/2009 | Alber | |
| 2009/0125528 A1* | 5/2009 | Choi | G06Q 10/107 |
| 2009/0138808 A1 | 5/2009 | Moromisato et al. | |
| 2009/0157811 A1 | 6/2009 | Bailor et al. | |
| 2011/0153746 A1 | 6/2011 | Callanan et al. | |
| 2011/0161449 A1* | 6/2011 | Callanan | H04L 51/046 709/206 |
| 2014/0032677 A1* | 1/2014 | Pittenger | G06Q 10/101 709/205 |
| 2015/0127603 A1* | 5/2015 | Cohen | H04L 63/101 707/608 |

* cited by examiner

*Primary Examiner* — Sherrod L Keaton
(74) *Attorney, Agent, or Firm* — Polsinelli PC

(57) ABSTRACT

Computer systems and methods, according to various embodiments, allow users with shared access to a shared file or folder to communicate with one another via online chat. In particular embodiments, the system is configured to facilitate a chat session among all users that have shared access to a particular file or folder in response to a particular user selecting a "chat" button (or other suitable chat initiation element) associated with the shared file or folder. After a chat session is complete, the system may archive the chat session for later viewing and use.

19 Claims, 8 Drawing Sheets

| | | | Home | | |
|---|---|---|---|---|---|
| Content Management Service | | | Get free space! | | Bill Smith |
| Name ▲ | | Kind | | Modified | |
| Getting Started.pdf 63a | | document pdf | | 12/19/2011 12:28 AM | |
| Patent Seminar (Chat archive) | | shared folder — 92 | | — 71a | |
| Photos | | folder | | -- | |
| Private Folders | | folder | | -- | |
| Public 63b | | folder | | -- | |
| Wedding Pictures (Chat archive) | | shared folder — 92 | | — 71b | |

Sharing
Links
Events
Get Started — 59

Help Privacy More ▲

FIG. 7

SYSTEMS AND METHODS FOR FACILITATING COMMUNICATION BETWEEN USERS OF A CONTENT MANAGEMENT SERVICE

CROSS REFERENCE TO RELATED APPLICATION

This application is a continuation of U.S. application Ser. No. 13/723,155, entitled SYSTEMS AND METHODS FOR FACILITATING COMMUNICATION BETWEEN USERS OF A CONTENT MANAGEMENT SERVICE, filed Dec. 20, 2012, the content of which is incorporated herein by reference in its entirety.

BACKGROUND

Currently, some online content management services allow users to share files, and folders of files, with other users. In some systems, multiple users may be granted access to edit or delete files within a particular shared folder, or to add new files to the folder. Other users may be provided with view-only access to files or folders of files. Users of such systems may desire to communicate with other users with whom they share particular files or folders. Accordingly, there is a need for improved systems and methods for providing communication between users of shared files and folders.

SUMMARY

A computer system, according to various embodiments, may include at least one processor and memory. The system may be configured for receiving, from a first user of a content management system, a request to initiate communication between all available users of the content management system that have shared access to a particular file or folder. In various embodiments, the particular file or folder may be stored in the content management system and, in response to receiving the request, the system may initiate communication between the all available users.

A computer-implemented method, according to certain embodiments, for facilitating communication between users of a particular shared file or folder, may include receiving, from a first user of a content management system, a request to initiate communication with between all available users having shared access to a particular file or folder. In various embodiments, the particular file or folder may be stored in the content management system and, in response to receiving the request, the system may substantially automatically initiate communication between all available users having shared access to the particular file or folder.

A non-transitory computer-readable medium, according to various embodiments, may stores computer-executable instructions for receiving a request to initiate a chat session among all users having shared access to a particular file or folder. The computer-readable medium may also store computer-executable instructions for identifying all users having shared access to the particular file or folder and, after the step of identifying all users having shared access to the particular file, facilitating a chat session between all users having shared access to the particular file folder.

BRIEF DESCRIPTION OF THE DRAWINGS

Various embodiments of a computer system for providing communication between users of a content management service are described below. In the course of this description, reference will be made to the accompanying drawings, which are not necessarily drawn to scale, and wherein:

FIGS. 4-8 shows screen displays of a content management service with various chat features according to a particular embodiment.

DETAILED DESCRIPTION

Figure 1:
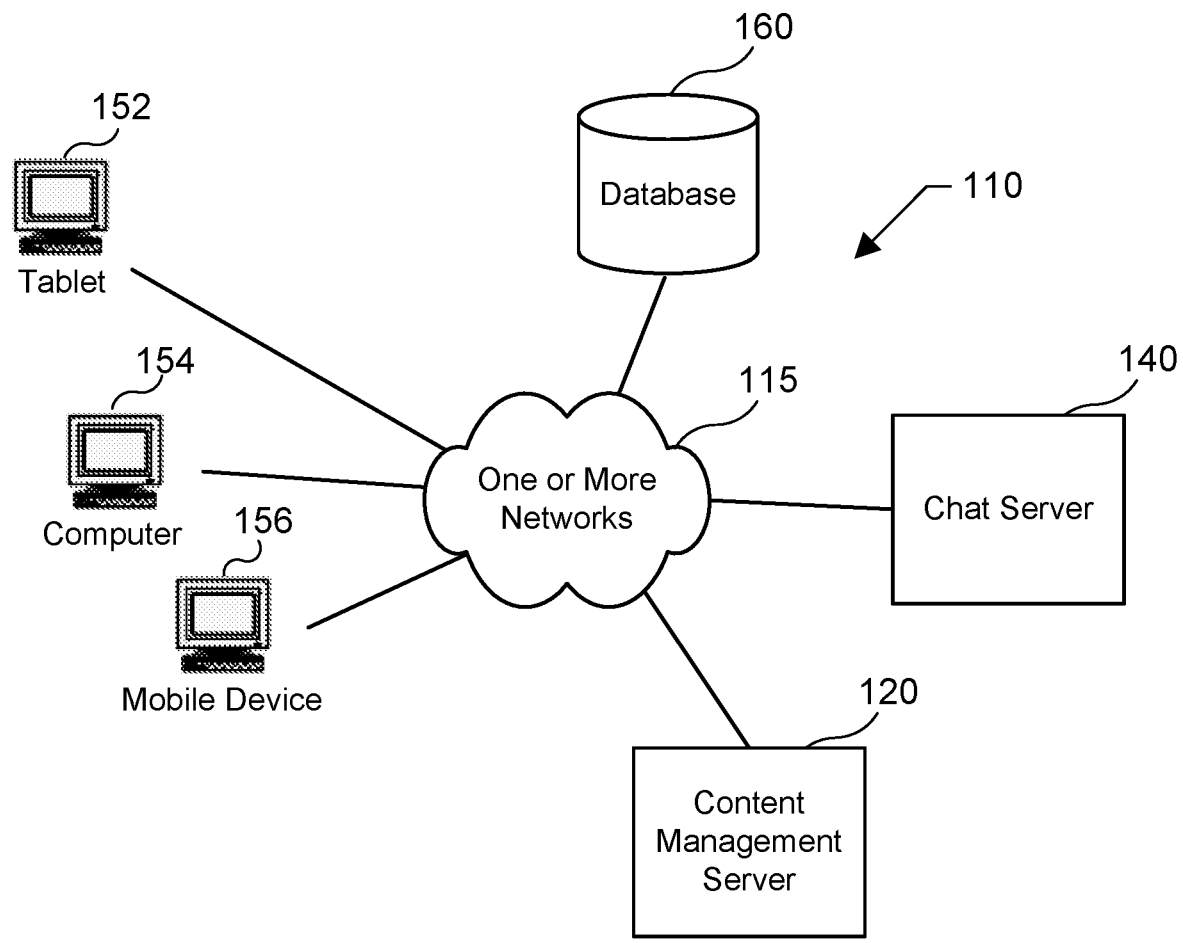
FIG. 1 shows a block diagram of a content management service in accordance with an embodiment of the present system.

Various embodiments now will be described more fully hereinafter with reference to the accompanying drawings. It should be understood that the invention may be embodied in many different forms and should not be construed as limited to the embodiments set forth herein. Like numbers refer to like elements throughout.

System Overview

Computer systems and methods, according to various embodiments, allow users with shared access to a shared file or folder to communicate with one another via online chat. In particular embodiments, the system is configured to initiate a chat session among one or more users with shared access to a particular file or folder in response to at least one user selecting a "chat" button (or other suitable chat initiation element) associated with the shared file or folder. For example, when a user selects the "chat" button, the system may open a chat interface on a respective computing device associated with each user who has shared access to the file or folder and who is currently online. Any of the users with shared access to the shared file or folder may then use the chat interface to participate in the chat (e.g., send chat messages to and/or receive chat messages from other users with shared access to the shared file or folder). In various embodiments, the system is configured to store a copy of any such chat sessions in a manner suitable to allow the users with shared access to the shared folder to later retrieve the stored chat sessions. This may, for example, allows users who are not online when a particular chat session occurs to review earlier chat sessions.

Exemplary Technical Platforms

The present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, smart mobile device, or other programmable data processing apparatus to produce a machine. As such, the instructions which execute on the general purpose computer, special purpose computer, smart mobile device, or other programmable data processing apparatus may create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Example System Architecture

FIG. 1 shows a block diagram of content management system 110 according to a particular embodiment. As may be understood from this figure, content management system 110 includes remote computing devices such as tablet computer 152, desktop or laptop computer 154, or mobile device 156 (e.g., a handheld device, a laptop, a tablet computer, a cellular phone, a smart phone, or any other device capable of transferring files over network 115) that are in communication with content management server 120 (which, for example, may be used to execute one or more modules as described below), chat server 140 (which, for example, may be used to execute one or more modules as described below), and content management database 160 (which, for example, may be used to store files within the content management system) via one or more networks 115. Network 115 between content management server 120 and remote computing devices 152, 154, and 156 may be, for example, implemented via one or more wired or wireless networks such as LANs, WANs, a cellular network, a Wi-Fi network, or via the Internet. For purposes of ease of explanation and clarity, no specific network is shown in FIG. 1. The users of each of tablet computer 152, desktop computer 154, and mobile device 156 may have file storage accounts on content management server 120.

Network 115 may include any of a variety of types of wired or wireless communication networks, such as the Internet. The communication link between content management server 120 and content management database 160 may be, for example, implemented via a LAN, WAN, or via the Internet. Mobile device 156 may transmit data wirelessly over cellular network by communicating with a cellular tower (not shown). The cellular tower may be coupled to a cellular network provider, which is operatively coupled to network 115.

In various embodiments, content management server 120 may include one or more servers that are located in close physical proximity, or some servers may be locally together and others remote. In either case, all devices, wherever located, function as a system.

Content management server 120 may enable file access and file storage between content management server 120 and remote computing devices 152, 154, and 156. Content management server 120 may receive files from and send files to remote computing devices 152, 154, 156 consistent with the user's preferences for sharing files. Content management server 120 may act as the counterpart to a client-side file storage service client application user interface that allows a user to manipulate files directly stored on content management server 120. In some embodiments, software operating on remote computing devices 152, 154, 156 may integrate network-stored files with the client's local file system to enable a user to manipulate network-stored files through the same user interface (UI) used to manipulate files on the local file system, e.g., via a file explorer, file finder, or browser application. As an alternative or supplement to the client-side file explorer interface, content management server 120 may provide a web interface for remote computing devices 152, 154, 156 to access (e.g. via a web browser) and allow a user to manipulate files stored on content management server 120. In this way, the user can directly manipulate files stored on content management server 120.

In various embodiments, content management database 160 may store files such as those uploaded using remote computing devices 152, 154, 156. It should be understood that, in various embodiments, content management database 160 may include multiple data stores—some local to, and some remote from, content management server 120.

Content management database 160 may maintain, for each user, information identifying the user, information describing the user's file directory, etc. in a file journal that is maintained for each user. In some embodiments, the file journal may be maintained on content management server 120. This file journal may be updated periodically using information obtained directly from content management server 120 and/or from information obtained from one or more remote computing devices 152, 154, 156. In this way, the server-stored file journal on content management server 120 (hereinafter the "server-side file journal") may be updated when a file is changed on the server or on the local client. Content management server 120 then may communicate with one or more remote computing devices 152, 154, 156 to assure that any relevant changes are reflected locally. For example, if a user makes a change to a particular file on a first client device, the change may be reflected in the server-side file journal. The system may then use the server-side file journal to propagate the changes to the file to all client devices associated with the file. Such techniques may be implemented, for example, within the context of a synchronized file system such as the Dropbox™ Service of Dropbox, Inc. of San Francisco, Calif.

Figure 2:
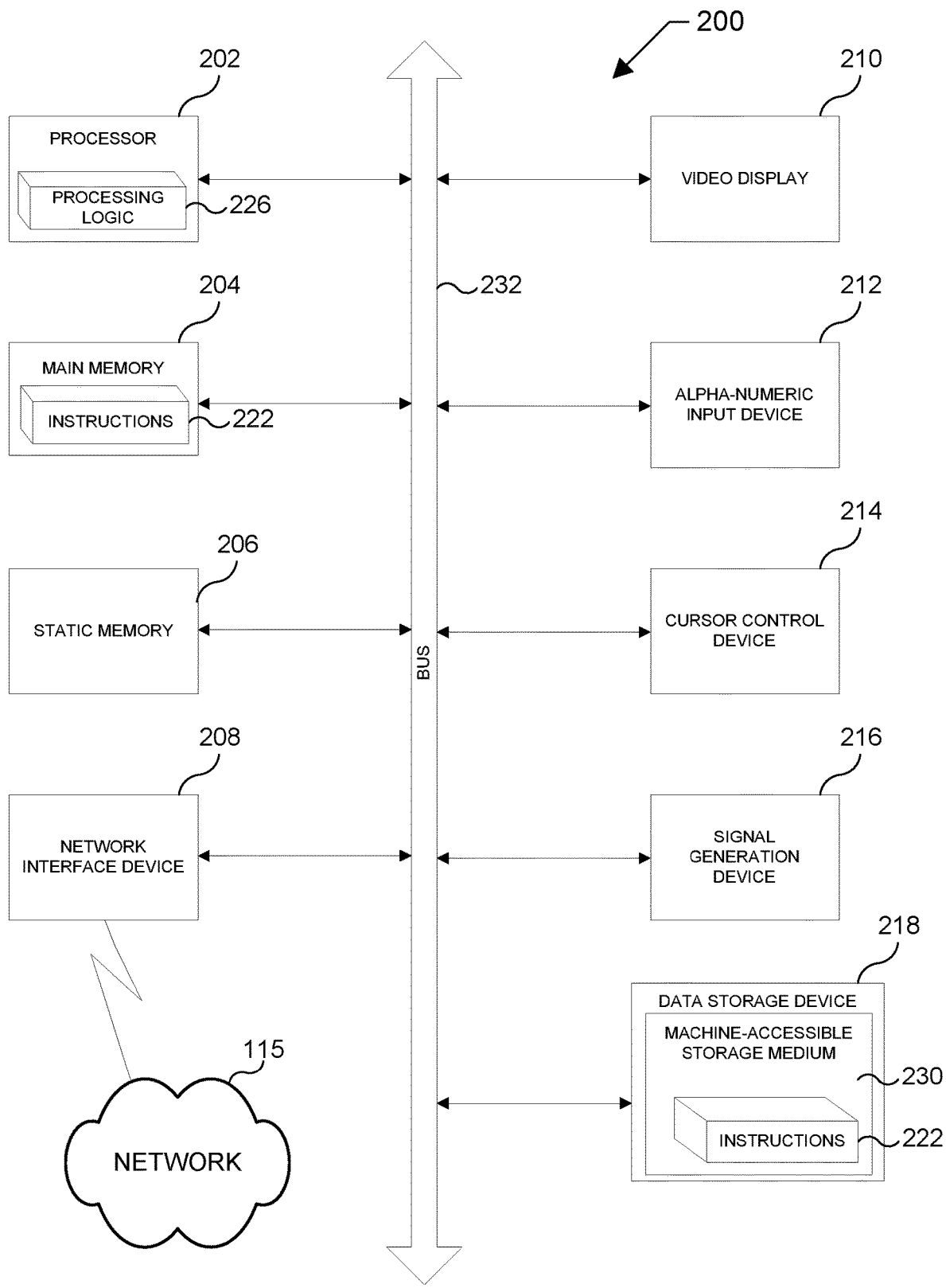
FIG. 2 shows a schematic diagram of the content management and chat server of FIG. 1.

FIG. 2 illustrates a diagrammatic representation of computer 200 that can be used within system 100, for example, as a client computer 152, 154, 156, or as a content management server 120 (FIG. 1). For purposes of this disclosure, reference to a server or processor, should be interpreted to include either a single server, a single processor, or multiple servers, or multiple processors.

In particular embodiments, computer 200 may be connected (e.g., networked) to other computers by a WAN, LAN, an intranet, an extranet, and/or the Internet. Computer 200 may operate in the capacity of a server or a client computer in a client-server network environment, or as a peer computer in a peer-to-peer (or distributed) network environment. Computer 200 may be personal computer (PC), a tablet computer or other mobile device, a web appliance, a server, a network router, a switch or bridge, or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

Exemplary computer 200 may include processor 202, main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and data storage device 218, which communicate with each other via bus 232.

Processor 202 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), a network processor, or the like. Processor 202 may be configured to execute processing logic 226 for performing various operations and steps discussed herein.

Computer 200 may further include a network interface device 208. Computer 200 also may include video display 210 (e.g., a liquid crystal display (LCD) or a cathode ray tube (CRT)), alpha-numeric input device 212 (e.g., a keyboard), cursor control device 214 (e.g., a mouse), and signal generation device 216 (e.g., a speaker).

Data storage device 218 may include machine accessible storage medium 230 (also known as a non-transitory computer-accessible storage medium, a non-transitory computer-readable storage medium, or a non-transitory computer-readable medium) on which is stored one or more sets of instructions (e.g., Shared File System Chat Module illustrated in FIG. 3) embodying any one or more of the methodologies or functions described herein. Shared File System Chat Module 300 may also reside, completely or at least partially, within main memory 204 and/or within processing device 202 during execution thereof by computer 200, main memory 204, and processing device 202 also constituting computer-accessible storage media. Instructions 222 (e.g., Shared File Chat Module) may further be transmitted or received over network 115 via network interface device 208.

Figure 6:
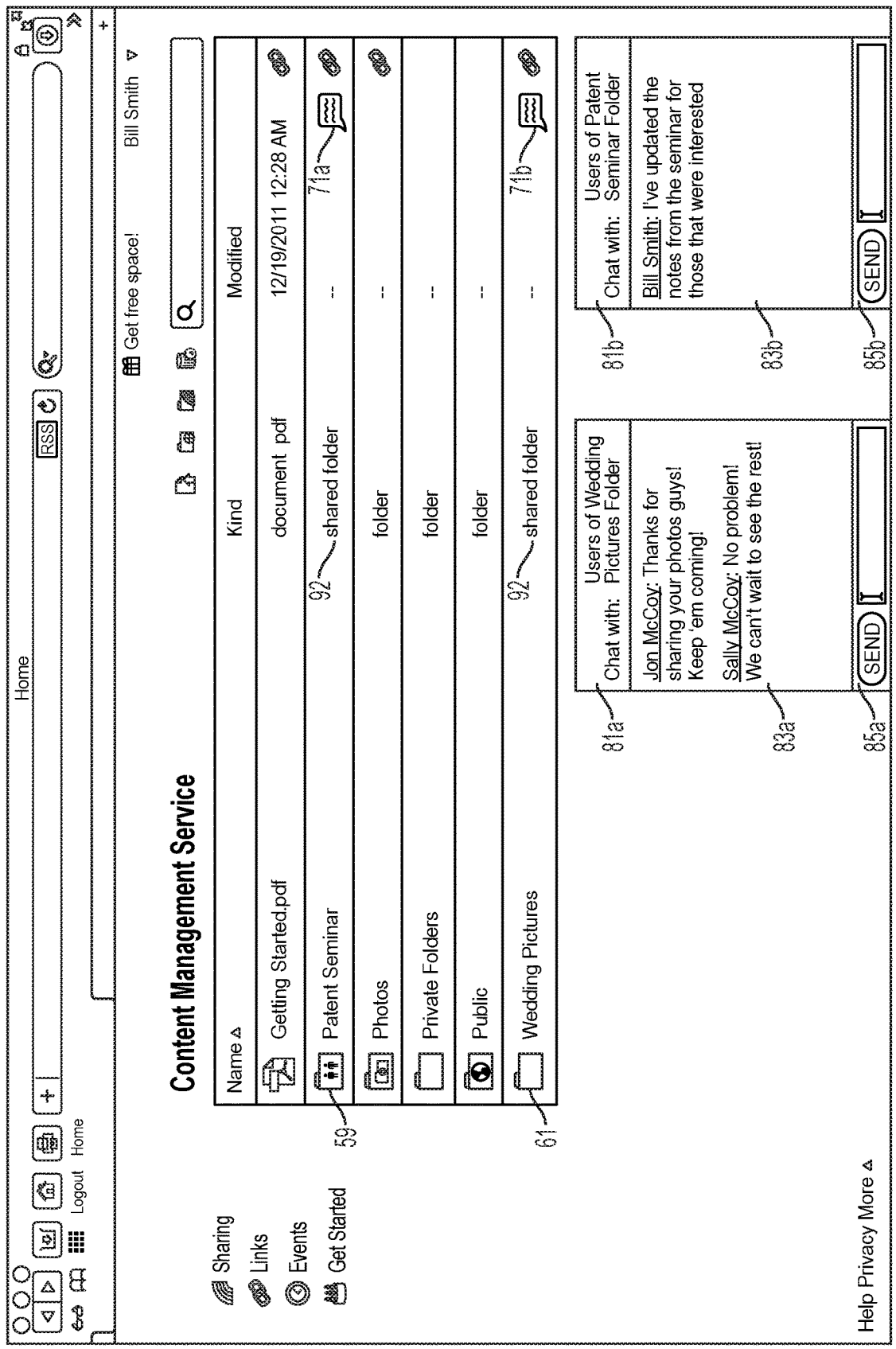

FIG. 6 illustrates an embodiment wherein a first non-marking protector comprises a shape similar to a wheel or torus (a surface of revolution generated by revolving a circle in three-dimensional space about a coplanar axis), and a second non-marking protector comprises a rectangular portion. This rectangular piece may be attached via bolts or similar fasteners, or may be of sleeve-like construction that snaps up and over the garage door arm. The door arm could also be inserted into a sleeve portion and thereby completely cover the door arm. The sleeve 106 in any of these alternate embodiments could used with or without any additional torus-shaped non-marking protectors.

Exemplary System Platform

Various embodiments may be implemented within the context of any suitable content management service (e.g., a synched content management service). For example, particular embodiments may be implemented within the context of a cloud-based content management service such as the Dropbox™ Service of Dropbox, Inc. of San Francisco, Calif. In certain embodiments, the content management service may provide users with access to files and folders that those users have stored in the content management service in addition to files and folders that have been stored there by other users. For example, users may have access to all of their own files as well as access to certain shared files and folders that were created and/or saved to a content management service account by others.

A particular user may receive permission to access any one of a shared file or folder, for example, by receiving an invitation to share access to a file or folder belonging to another user, or any other suitable manner of receiving permission to access a shared file or folder. The system may then be configured to allow users with shared access to at least one shared file or folder to communicate with other users who have with shared access to the shared file or folder via text messaging or any other suitable means of communication. In particular embodiments, a user may initiate a text messaging session with all users with access to a particular shared file or folder by selecting a single button or other suitable selection element.

As noted above, various aspects of the system's functionality may be executed by certain system modules, including the system's Chat Module 300. This module is discussed in greater detail below.

Chat Module

Figure 3:
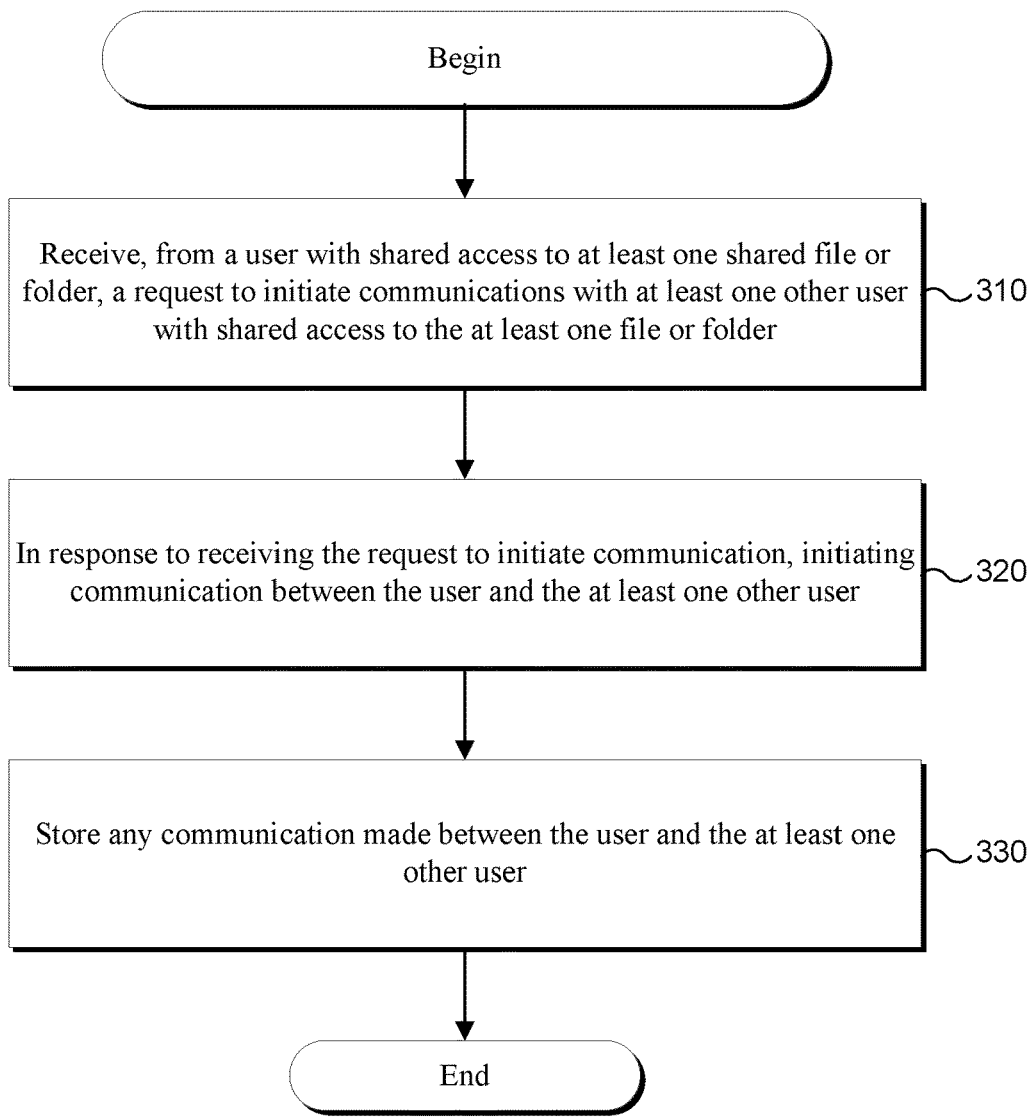
FIG. 3 shows a flow chart that generally illustrates various steps executed by a chat module that, for example, may be executed by the content management and chat server of FIG. 1.

FIG. 3 shows a flow chart of steps that may be executed by exemplary Chat Module. In particular embodiments, Chat Module may enable communication between various users of the content management service, for example, via a network.

When executed by the system, the Chat Module may begin at Step 310 by receiving, from a user of a content management service with shared access to at least one shared file or folder, a request to initiate communication with at least one other user with shared access to the at least one shared file or folder. In particular embodiments, the system may receive the request to initiate communication when the user selects a suitable selection element or icon (e.g., a button) in a user interface associated with the system. In various embodiments, the selection element may be associated with a particular shared file or folder within the content management service and the at least one other user of the content management service includes at least one other user with permission to share the particular file or folder. In particular embodiments, the request to initiate communication with at least one other user with shared access to the at least one file or folder may be an indication of a desire to communicate with all (or at least substantially all) users with shared access to (e.g., permission to at least access) a particular file or folder.

For example, if three users (e.g., a first user, a second user, and a third user) have shared access to a folder within the content management service called "Photos", any one of the users (e.g., the first user) may initiate communication with the other authorized users (e.g., the second user and third user), for example, by selecting one or more selection elements associated with the "Photos" folder (e.g., by selecting a chat button adjacent to the "Photos" folder, selecting 'chat' as an option when right-clicking the "Photos" folder, or performing any other suitable action indicating a desire to initiate communication with the other users that share access to the "Photos" folder). In response to the selection of one or more indicia associated with the "Photos" folder by the first user, the system may receive, at Step 310, the first user's request to initiate communication with the second and third user.

The system may continue, at Step 320, by, in response to receiving the request to initiate communication, initiating communication between the user and another user. In particular embodiments, the system may initiate communication between the user and another user by providing a chat interface (e.g., to the user and the at least one other user), which a user may use to input communications using any conventional input device (e.g., a keyboard). The user may then activate one or more selection elements associated with the chat interface (e.g., a send button) to transmit the input communication (e.g., text communication) to the at least one other user. In other embodiments, the system may initiate communication between the users of the content management service via, for example, an internal chat application, a third party instant-messaging program (e.g., such as MSN® messenger, iChat®, Goggle Chat™, etc.), or any other suitable manner of communication.

In various embodiments, once communication has been initiated by the system at Step 320, the user and at least one other user may communicate substantially freely back and forth with one another within the context of the chat interface. In various embodiments, communications sent by the user may be displayed to another user (e.g., via an on-screen chat interface on a display screen of a device associated with the at least one other user such as a smart phone, laptop, tablet, etc.). In particular embodiments, the chat interface may include a pop-up window or other on-screen window that displays communications both to and from each user and further includes a chat input portion in which the user may enter any communications that the user wishes to send to the at least one other user.

In various embodiments, the system may be configured to display any communications only to those users of the shared file/folder that are currently online (e.g., currently accessing the content management service and/or are currently accessing the particular shared file of folder from which the communication originated). In particular embodiments, the system may be configured to send any communications to such users substantially instantaneously so that the users may communicate with each other at least substantially in real time. In some embodiments, the system may be configured to also display communications to users not currently online (e.g., not currently accessing the content management service) upon those users' next access of the content management service. In various embodiments, users may receive a notification of the occurrence of any recent chat sessions involving their shared files/folders while the user was off-line. A notification may help keep the user up to date in regard to conversations regarding the user's shared files/folders.

Returning to FIG. 3, the system may continue, at Step 330, by storing any communication made between the user and the at least one other user. In particular embodiments, the system may store the communications in a suitable file for storing communications (e.g., a text file or other suitable document) within the shared folder associated with the request to initiate communication received at Step 310. For example, continuing the example of the "Photos" folder above, the system may store any communications among the first, second and third users in an appropriate file within the "Photos" folder (e.g., as a file named Chat_archive.doc). In other embodiments, the system may store communications in any other suitable manner that allows the users to review any past communications.

Example User Experience

Exemplary user interfaces for a particular embodiment of content management system 110 are shown in FIGS. 4-8. These figures represent an interface displayed on desktop computers, mobile devices (such as smart phones tablet computers, laptops, etc.), and other similar devices. These interfaces may be used by users of a particular content management service to communicate with one or more other users.

Figure 4:
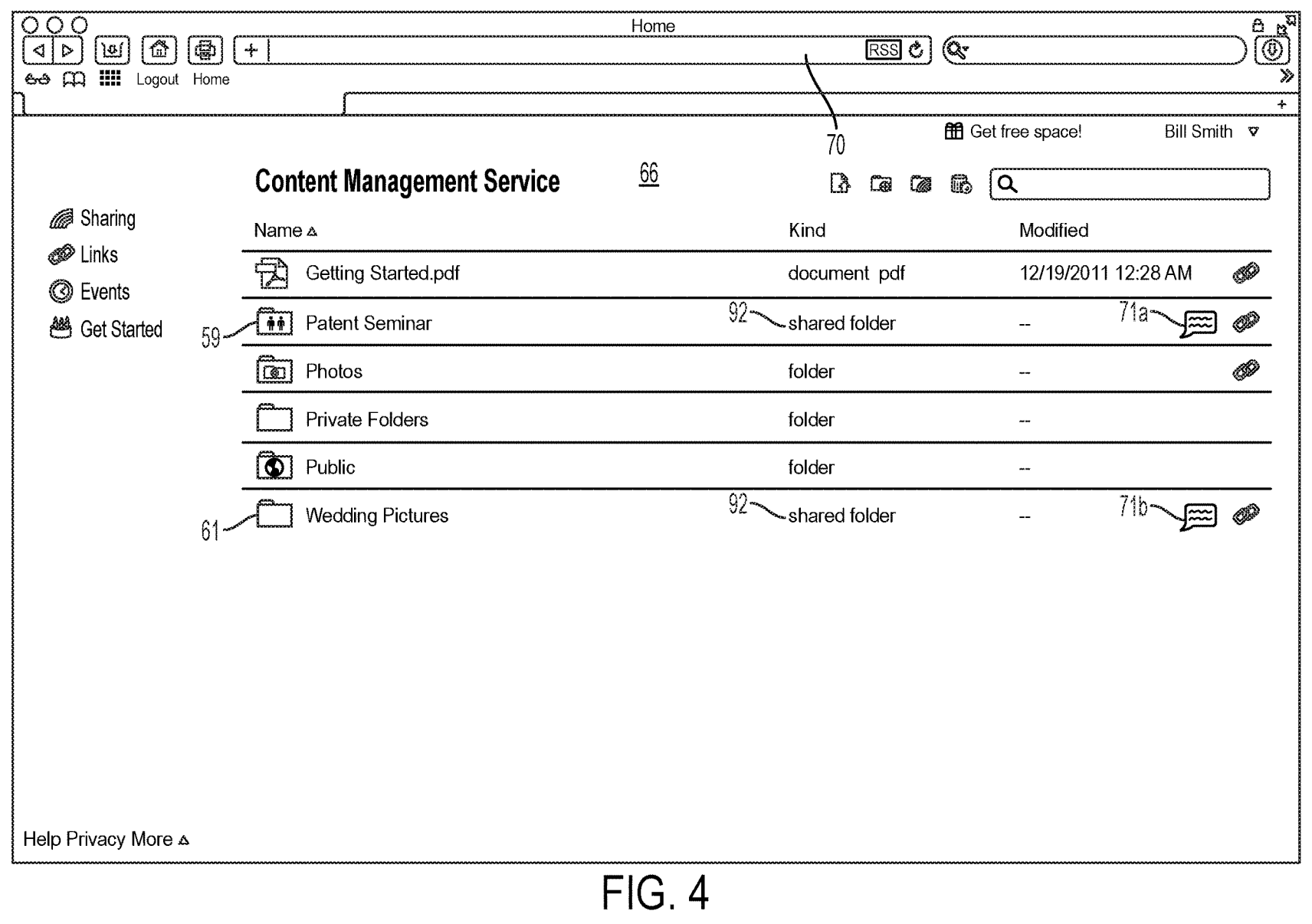

FIG. 4 shows a screen shot of an exemplary user interface for accessing a content management service according to a particular embodiment. In the embodiment shown in this figure, the interface for accessing the content management service may include file interface 66 which a user may use to access various files and folders stored within their account with the content management service. As may be understood from this figure, particular folders within the user's account, in this example, are shared folders 92 (e.g., Patent Seminar Folder 59 and Wedding Picture Folder 61 in FIG. 4). In particular embodiments, those folders which are shared folders 92 include a selection element (e.g., chat button 71a, 71b) that a user may select to initiate a chat session with one or more other users that have permission to access the particular associated shared folder. A user wishing to initiate a chat session with other users having access to Patent Seminar Folder 59 may, for example, select chat button 71a associated with Patent Seminar Folder 59.

Figure 5:
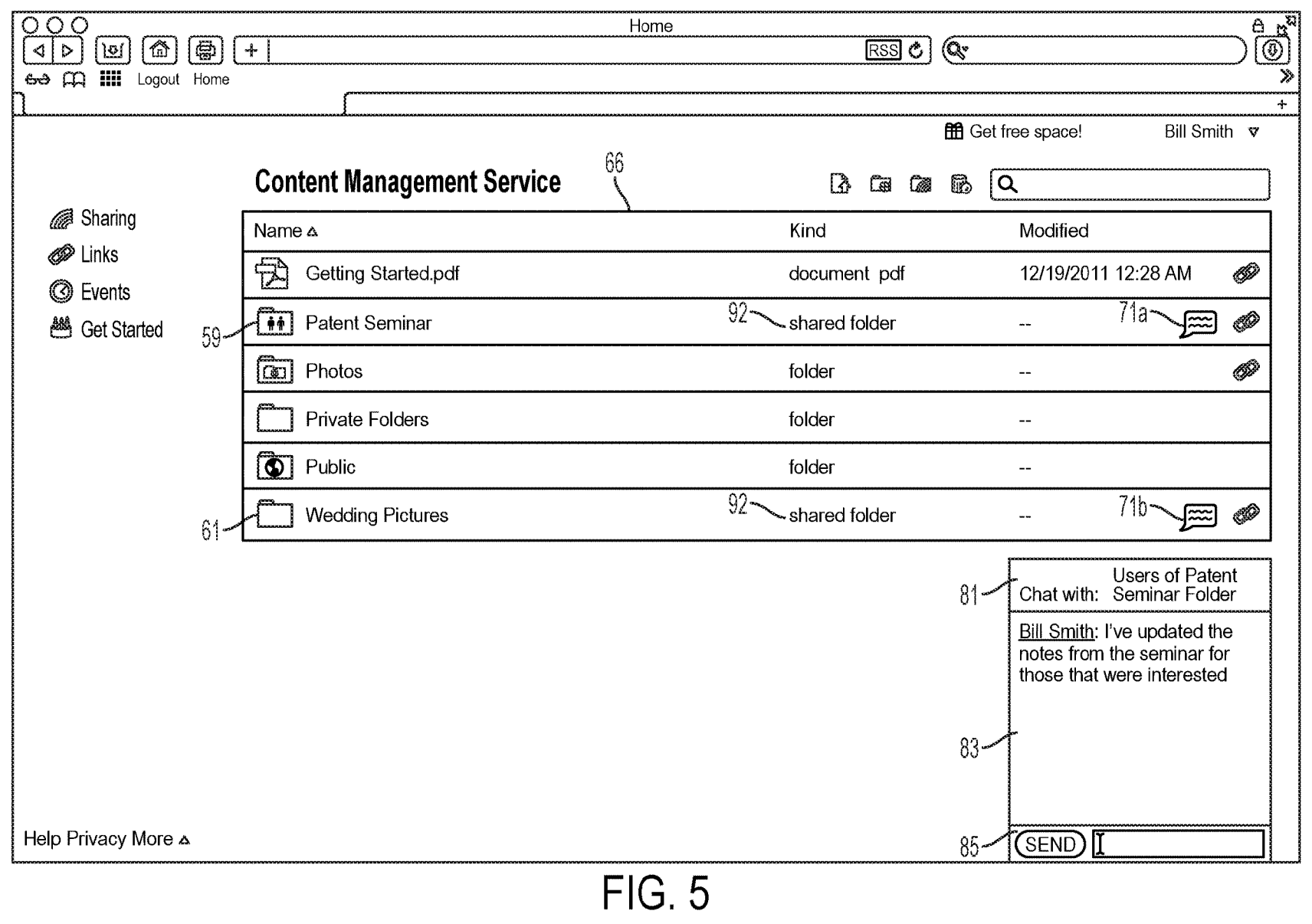

In the embodiment shown in FIG. 5, the system, having received an indication from the user to initiate a chat session (e.g., in response to the user selecting chat button 71a associated with Patent Seminar Folder 59) initiates a chat session among the user and one or more other users (e.g., only those users online at the time of the initiation of the chat session) with shared access to the Patent Seminar Folder 59 and displays chat interface 81 to the user. In the embodiment shown in this figure, chat interface 81 includes chat window 83 and chat input box 85. As may be understood from this figure, chat window 83 displays any chat messages or other communications made by the user or by the one or more other users with shared access to Patent Seminar Folder 59. For example, as shown in this figure, the user, Bill Smith, has sent a chat message to the users with shared access to Patent Seminar Folder 59 stating: "I've updated the notes from the seminar for those that were interested." Although, in the example chat session shown in FIG. 5, the user's chat relates to the contents of Patent Seminar Folder 59, users of the shared filed system communication system may initiate a chat session to communicate any information to the other users of the shared folder (e.g., communications relating to any topic, even if the topic is unrelated to the particular folder). Chat input box 85 may allow the user to enter chat messages (e.g., using a keyboard) and includes an indicia for sending any entered chat messages to the other users with shared access to the folder.

In particular embodiments, such as the embodiment shown in FIG. 6, the user may communicate with users of a plurality of shared folders (e.g., the users with shared access to each particular shared folder) at substantially the same time (e.g., simultaneously). For example, as shown in FIG. 6, the user (e.g., Bill Smith in FIG. 6) may send one or more chat messages to users with shared access to a particular folder (e.g., Patent Seminar Folder 59) via chat interface 81*b* while receiving communications from one or more users with shared access to another particular folder (e.g., Wedding Pictures Folder 61) via second chat interface 81*a*. In other embodiments, the user may send or receive communications (e.g., chat messages) to any number (e.g., a plurality) of particular groups of users with whom the user shares access to particular files or folders. As may be understood from FIG. 6, the user (e.g., Bill Smith), in addition to sending communications, may respond to communications that the user (e.g., Bill Smith) receives (e.g., by inputting text into the chat interface's chat input box 85*a* associated with the user or users of the shared folder (e.g., Wedding Pictures Folder 61) from whom the user (e.g., Bill Smith) received communications).

As shown in FIG. 7, particular embodiments of a content management service communication system may allow a user to access an archive of past communications (e.g., a chat history) that have occurred in association with particular shared files or folders. Users may access the archive of past communications for a particular shared file or folder via indicia (e.g., chat archive button 63*a*-*b*) associated with the particular shared file or folder. For example, a user wishing to view an archive of any chats that have occurred in association with shared Patent Seminar Folder 59 may select chat archive button 63*a* associated with Patent Seminar Folder 59.

Figure 8:
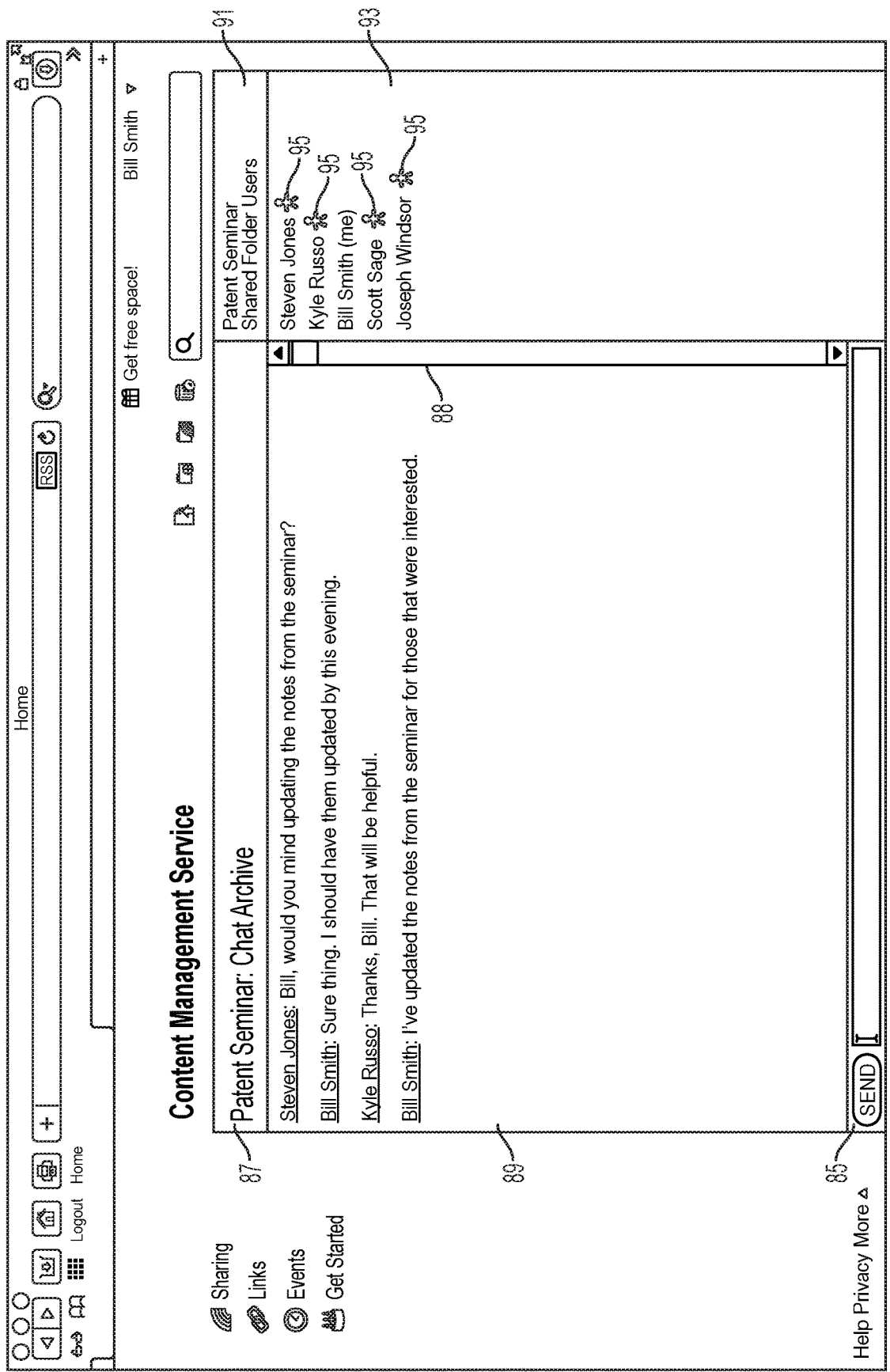

FIG. 8 shows an exemplary chat archive interface in which a user may be able to view archived chat messages (e.g., a chat history) of any communications sent or received to or from the users with shared access to Patent Seminar Folder 59, for example, via chat archive interface 87. As shown in this figure, chat archive interface 87 includes chat archive 89 and chat input 85. As may be understood from this figure, chat archive 89 may include an archive of any communications (e.g., chats messages) that have occurred in association with shared Patent Seminar Folder 59 (e.g., including communications sent by the user as well as communications received from other users with shared access to Patent Seminar Folder 59). The user may access complete chat archive 89, for example, by activating scroll bar 88 to scroll through a complete history of chat messages. In various embodiments, chat archive 89 may further include time and date stamps of each particular communication (e.g., each chat message). In the embodiment shown in this figure, the user may send new communications (e.g., chat messages) from chat archive interface 87, for example, using chat input 85 associated with chat archive interface 89. Chat input 85 may allow the user to enter new chat messages (e.g., using a keyboard) and may include an indicia for sending any entered chat messages to the users with shared access to the folder.

In the embodiment shown in FIG. 8, chat archive interface 87 may also include shared folder user list 91 which may include a listing of users with shared access 93 (e.g., users with shared access to the particular folder (e.g., Patent Seminar Folder 59)). Shared folder user list 91 may further include indicia (e.g., status indicators 95) from which the user may discern the current status of the other users with shared access to the particular file or folder (e.g., whether the other users are substantially currently (e.g., currently) online (e.g., accessing the shared folder)). Status indicators 95 may, for example, indicate an online or offline status by changing color, by appearing and disappearing, or by any other suitable manner of indicating a change in status. In chat archive interface 87 shown in FIG. 8, for example, the presence of status indicator 95 adjacent (e.g., to) the names of shared users Steven Jones, Kyle Russo, Scott Sage, and Joseph Windsor may indicate that all of those users are currently accessing the shared folder.

It should be understood that other techniques may be used to archive past chat messages (or other communications according to various embodiments). For example, the system may save past chat messages to a text file, or other suitable document, that is stored in the shared folder that the chat messages relate to.

Alternative Embodiments

Voice/Video Chat

In particular embodiments, the system may be configured to allow users of a content management service to communicate using communication methods other than text communications, such as video or audio communication. In various embodiments, the system may be configured to allow a user to initiate (in the manner described above) a voice or video conference with another user of the content management service (e.g., all users with shared access to a shared file or folder). The user may, for example, communicate via video conference using a video camera and microphone associated with the device with which the user accesses the content management service (e.g., using the built-in web camera and microphone of a laptop computer, using a built in camera and microphone of a smart phone or other handheld mobile device, or any other suitable device capable of transmitting video, audio, or both).

Directing Chat Messages to Selected Users with Shared Access to a Particular Shared File or Folder In particular embodiments, the system may be configured to allow a particular user to initiate communications (e.g., chat communications) with a selected subset of all users with shared access to a particular shared file or folder. For example, a user may direct a chat message to only one user with shared access to a particular shared folder. In various embodiments, the system may be configured to allow the user to select particular users (e.g., one or more particular users) from among all users with shared access to a particular file or folder, for example, by right-clicking on a chat initiating indicia associated with the particular file or folder and selecting the particular users with whom the user wishes to chat (e.g., by clicking on or otherwise selecting the users by name or username (e.g., from a drop-down menu)). In other embodiments, the user may select a particular subset of users with shared access to a particular file or folder in any other suitable manner (e.g., via a "Buddy-List" associated with the particular file or folder, by manually entering the names of those users with shared access to the particular file or folder with whom the user would like to communicate, etc.).

Tagging Particular Files within a Shared Folder in Communications

In particular embodiments, users of the content management service communication system can associate (e.g., tag) a communication (e.g., a chat) with particular files within a particular shared folder when sending communications (e.g., chats) to the other users with shared access to the particular shared folder. For example, in the context of a shared "Photos" folder, a user may send a communication to the other users with shared access to the "Photos" folder saying something along the lines of: "does anyone have a higher resolution version of this picture—I'd like to print a blown up version of it". The user may then associate (e.g., tag) the particular picture within the shared folder to which they are referring. In particular embodiments, when a user associates a particular file with a communication, the system may include a link to the file in the communication. In other embodiments, the system may provide a preview or sample of the associated file (e.g., such as a thumbnail if the file is an image file, a snapshot if the file is a document, or any other suitable preview or sample (e.g., which may depend at least in part on the type of file associated)).

Conclusion

Many modifications and other embodiments of the invention will come to mind to one skilled in the art to which this invention pertains having the benefit of the teachings presented in the foregoing descriptions and the associated drawings. While examples discussed above cover the use of the invention in the context a content management service, the invention may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

I claim:

1. A computer system comprising: at least one processor, wherein the computer system is configured to:
    store a particular shared file or folder at a content management system, the particular shared file or folder being shared and synchronized between a first account of the content management system and a second account of the content management system;
    provide, by the content management system, a respective copy of the particular shared file or folder to each of the first account and the second account, wherein the content management system synchronizes the particular shared file or folder with a first copy of the particular shared file or folder stored at a first user device using a first client side application and a second copy of the particular shared file or folder stored at a second user device using a second client side application, wherein the content management system synchronizes the first copy and the second copy of the particular shared file or folder to each of the first account and the second account;
    after the particular shared file or folder is shared with the first account of the content management system and the second account of the content management system, associate, by the content management system, an at least one archived chat session with the particular shared file or folder, wherein the at least one archived chat session is associated with the particular shared file or folder after the at least one archived chat session is archived with the content management system; and
    provide, by the content management system, a file interface that includes a selection element configured to initiate a chat session with a subset of available chat authorized users, one or more indicia of the particular shared file or folder, and one or more indicia of the at least one archived chat session associated with the particular shared file or folder, wherein the one or more indicia of the at least one archived chat session includes a link to the at least one archived chat session and wherein the subset of available chat authorized users is determined by the content management system based on chat authorized users accessing the content management system.

2. The computer system of claim 1, wherein the computer system is further configured to determine, by the content management system, a set of all chat-authorized users with shared access to the particular shared file or folder based on a share status of the particular shared file or folder; and identify all available chat-authorized users currently accessing the content management system and initiating communication among any of the available chat-authorized users.

3. The computer system of claim 1, wherein the file interface further includes a selection element that initiates a chat session with all available chat-authorized users.

4. The computer system of claim 1, wherein the computer system is further configured to store a chat communication archive file in association with the particular shared file or folder.

5. The computer system of claim 1, wherein providing the file interface further includes the interface being provided to the first client side application associated with the content management system on the first user device and the second client side application associated with the content management system on the second user device.

6. The computer system of claim 5, wherein the computer system is further configured to initiate communication between the first client side application and the second client side application.

7. The system of claim 1, wherein the at least one archived chat session includes the chat session with the subset of all chat-authorized users.

8. The system of claim 1, wherein the at least one archived chat session is archived by a chat service.

9. A computer-implemented method for facilitating communication between users of a particular shared file or folder, the method comprising the steps of:
    storing by a memory in a content management system, a particular shared file or folder, the particular shared file or folder being shared and synchronized between a first account of the content management system and a second account of the content management system;
    providing by the content management system, a respective copy of the particular shared file or folder to each of the first account and the second account, wherein the content management system synchronizes the particular shared file or folder with a first copy of the particular shared file or folder stored at a first user device using a first client side application and a second copy of the particular shared file or folder stored at a second user device using a second client side application, wherein the content management system synchronizes the first copy and the second copy of the particular shared file or folder to each of the first account and the second account;

after the particular shared file or folder is shared with the first account of the content management system and the second account of the content management system, associating, by the content management system, an at least one archived chat session with the particular shared file or folder, wherein the at least one archived chat session is associated with the particular shared file or folder after the at least one archived chat session is archived with the content management system; and providing, by the content management system, a file interface that includes a selection element configured to initiate a chat session with a subset of available chat authorized users, one or more indicia of the particular shared file or folder and one or more indicia of the at least one archived chat session associated with the particular shared file or folder, wherein the one or more indicia of the at least one archived chat session includes a link to the at least one archived chat session and wherein the subset of available chat authorized users is determined by the content management system based on chat authorized users accessing the content management system.

10. The method of claim 9, the method further comprising the steps of:

determining by the content management system, a set of all chat-authorized users with shared access to the particular shared file or folder based on a share status of the particular shared file or folder; and identifying all available chat-authorized users currently accessing the content management system and initiating communication among any of the available chat-authorized users.

11. The method of claim 9, wherein the file interface further includes a selection element that initiates a chat session with all available chat-authorized users.

12. The method of claim 9, the method further comprising the steps of: storing a chat communication archive file in association with the particular shared file or folder.

13. The method of claim 9, wherein the step of providing the file interface further includes the interface being provided to the first client side application associated with the content management system on the first user device and the second client side application associated with the content management system on the second user device.

14. The method of claim 13, further comprising the steps of: initiate communication between the first client side application and the second client side application.

15. A non-transitory computer-readable medium storing computer-executable instructions to:

store a particular shared file or folder at a content management system, the particular shared file or folder being shared and synchronized between a first account of the content management system and a second account of the content management system;

provide, by the content management system, a respective copy of the particular shared file or folder to each of the first account and the second account, wherein the content management system synchronizes the particular shared file or folder with a first copy of the particular shared file or folder stored at a first user device using a first client side application and a second copy of the particular shared file or folder stored at a second user device using a second client side application, wherein the content management system synchronizes the first copy and the second copy of the particular shared file or folder to each of the first account and the second account;

after the particular shared file or folder is shared with the first account of the content management system and the second account of the content management system, associate, by the content management system, an at least one archived chat session with the particular shared file or folder, wherein the at least one archived chat session is associated with the particular shared file or folder after the at least one archived chat session is archived with the content management system; and provide, by the content management system, a file interface that includes a selection element configured to initiate a chat session with a subset of available chat authorized users, one or more indicia of the particular shared file or folder and one or more indicia of the at least one archived chat session associated with the particular shared file or folder, wherein the one or more indicia of the at least one archived chat session includes a link to the at least one archived chat session and wherein the subset of available chat authorized users is determined by the content management system based on chat authorized users accessing the content management system.

16. The non-transitory computer-readable medium of claim 15, wherein the instructions are further configured to:

determine, by the content management system, a set of all chat-authorized users with shared access to the particular shared file or folder based on a share status of the particular shared file or folder; and identify all available chat-authorized users currently accessing the content management system and initiating communication among any of the available chat-authorized users.

17. The non-transitory computer-readable medium of claim 15, wherein the instructions are further configured to store a chat communication archive file in association with the particular shared file or folder.

18. The non-transitory computer-readable medium of claim 15, wherein the step of providing a file interface further includes the interface being provided to a first client side application associated with the content management system on the first user device and a second client side application associated with the content management system on the second user device.

19. The non-transitory computer-readable medium of claim 18, wherein the instructions are further configured to initiate communication between the first client side application and the second client side application.

* * * * *